United States Patent
Kim

(10) Patent No.: US 7,376,201 B2
(45) Date of Patent: May 20, 2008

(54) SYSTEM AND METHOD FOR REDUCING CREST FACTOR OF SIGNAL

(75) Inventor: Yongsub Kim, Anyang (KR)

(73) Assignees: Danam Inc., Kyunggi-Do (KR); Danam USA Inc., San Jose, CA (US)

(*) Notice: Subject to any disclaimer, the term of this patent is extended or adjusted under 35 U.S.C. 154(b) by 665 days.

(21) Appl. No.: 10/880,242

(22) Filed: Jun. 29, 2004

(65) Prior Publication Data

US 2004/0264595 A1  Dec. 30, 2004

(30) Foreign Application Priority Data

Jun. 30, 2003  (KR) .................... 10-2003-0043652
Sep. 4, 2003   (KR) .................... 10-2003-0061744

(51) Int. Cl.
*H04K 1/02* (2006.01)

(52) U.S. Cl. .............. 375/296; 375/260; 375/350; 375/259; 327/37; 327/62; 327/9; 708/300

(58) Field of Classification Search .......... 375/259, 375/260, 350, 296; 708/300; 327/37, 62, 327/9

See application file for complete search history.

(56) References Cited

U.S. PATENT DOCUMENTS

| | | | | |
|---|---|---|---|---|
| 6,038,261 | A * | 3/2000 | Mestdagh | 375/285 |
| 7,061,991 | B2 * | 7/2001 | Wright et al. | 375/296 |
| 6,529,925 | B1 * | 3/2003 | Schenk | 708/300 |
| 2005/0069045 | A1 * | 3/2005 | Laaser | 375/260 |
| 2005/0141408 | A1 * | 6/2005 | Anvari | 370/206 |

* cited by examiner

*Primary Examiner*—Shuwang Liu
*Assistant Examiner*—Helene Tayong
(74) *Attorney, Agent, or Firm*—G W i P S

(57) ABSTRACT

A new system and method is developed for reducing the crest factor of a signal. The system includes a large signal extraction module for receiving the input signal and the magnitude of the input signal to extract a large signal greater than a predetermined threshold $\theta$; a large signal transformation module for converting the extracted large signal to a monotonically increasing concave function; a large signal filtering module for filtering the large signal transformed by the large signal transformation module to pass a predetermined band of the large signal; a delay means for shifting the phase of the input signal; and a combiner means for combining the signal output from the large signal filtering module with the input signal whose phase has been shifted by the delay means to reduce the crest factor of the input signal.

11 Claims, 7 Drawing Sheets bandpass filter 1: impulse response h₁(n)

f1: center frequency of filter 1

⇓ bandpass filter k: hk(n)

f1            fk: center frequency of filter k

SYSTEM AND METHOD FOR REDUCING CREST FACTOR OF SIGNAL

BACKGROUND OF THE INVENTION

1. Field of the Invention

The present invention relates to a system and a method for reducing the crest factor of a signal, and more particularly, to a system and a method for reducing the crest factor of a signal which can reduce the crest factor without having information about an individual channel and be applied to baseband, IF and RF signals.

2. Related Prior Art

A crest factor is an important characteristic of an RF signal in the transmission of the RF signal. The crest factor is a ratio of a peak value to an effective value of a signal waveform. That is, the crest factor is obtained by dividing a peak value of a signal by an effective rms value of the signal, and represents a degree of sharpness of a wave front. The crest factor is represented as follows.

$$CF(\text{Crest Factor}) = \frac{PeakValue}{RMSValue} \qquad [\text{Equation 1}]$$

For example, a sine wave has a crest factor of $\sqrt{2}$ and a random wave can theoretically have a crest factor of an infinite value.

The crest factor is determined by a peak-to-average voltage ratio in the transmission of a multi-carrier of a digital signal. That is, the crest factor is proportional to the square root of a peak-to-average power ratio of a transmission signal.

Conventional techniques for reducing the crest factor of a signal include a clipping method and a baseband control method.

In the clipping method, a baseband signal has its amplitude clipped at a constant level. The clipping method removes the peak of a signal to reduce the crest factor of the signal. Though clipping is a simple technique because it is nonlinear processing, it should be carefully used. For example, the filter for filtering a clipped signal must be carefully selected.

The baseband control method controls the frequency band of an original signal before the modulation of the frequency band for the transmission of the signal, in order to reduce the crest factor of the signal. This method requires information about a transmission channel.

FIG. 1 is a block diagram of a conventional system and method for reducing the peak-to-average power ratio of a multi-carrier signal, which is disclosed in U.S. Pat. No. 6,314,146. In FIG. 1, reference numeral 840 denotes a receiver and a block 855 estimates a signal distorted by clipping in order to restore an original signal. This technique clips the original signal at transmission to reduce the peak-to-average power ratio of the signal. When the signal is clipped to a distorted form and transmitted to the receiver, the receiver makes an estimate of the clipped portions of the signal in order to restore the original signal. At this time, the receiver also receives information about signal clipping (clipping size, clipping peak and so on). This technique reduces the peak-to-average power ratio without having the loss of bandwidth of the original signal.

SUMMARY OF THE INVENTION

Accordingly, the present invention has been made in order to reduce the crest factor of a signal in a different manner from the conventional art and it is an object of the present invention to provide a system and a method for reducing the crest factor of a contiguous band signal and a multi-carrier signal which can reduce the crest factor without having information about an individual channel and be applied to baseband, IF and RF signals.

Another object of the present invention is to provide a system and a method for reducing the crest factor of a signal which employs a band pass filter that can be easily designed.

Yet another object of the present invention is to provide a system and a method for reducing the crest factor of a signal in which a crest factor reduction module is used in various manners by setting the value of a programmable parameter (the threshold θ).

To achieve the objects of the present invention, according to the present invention, there is provided a system for reducing the crest factor of a multi-carrier input signal including at least one carrier, comprising a large signal extraction module, a large signal transformation module, a large signal filtering module, a delay means, and a combiner.

The large signal extraction module receives the input signal and the magnitude of the input signal to extract a large signal greater than a predetermined threshold θ. The large signal transformation module converts the extracted large signal to a monotonically increasing concave function. The large signal filtering module filters the large signal transformed by the large signal transformation module to pass a predetermined band of the large signal. The delay means shifts the phase of the input signal. The combiner combines the signal output from the large signal filtering module with the input signal whose phase has been shifted by the delay means to reduce the crest factor of the input signal.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
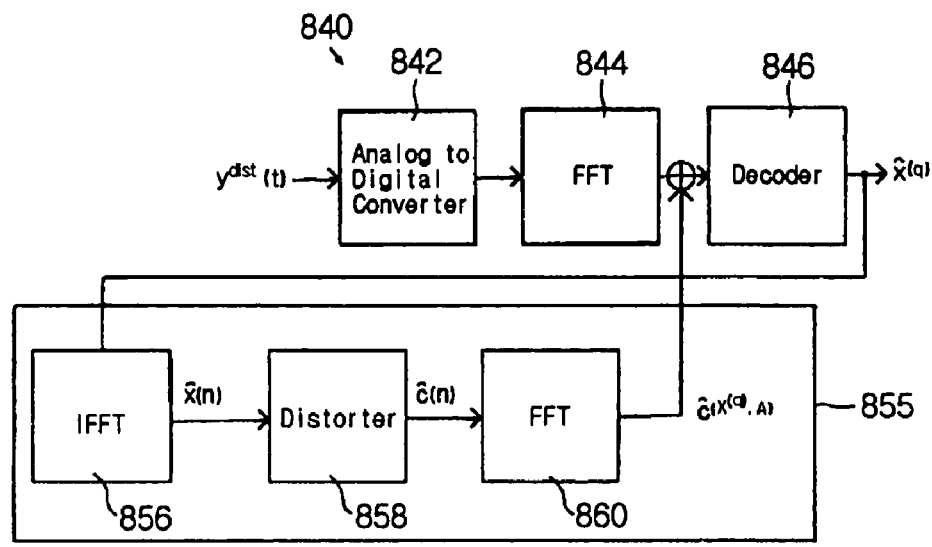
FIG. 1 is a block diagram of a conventional system for reducing the peak-to-average power ratio of a multi-carrier signal.
Figure 2A:
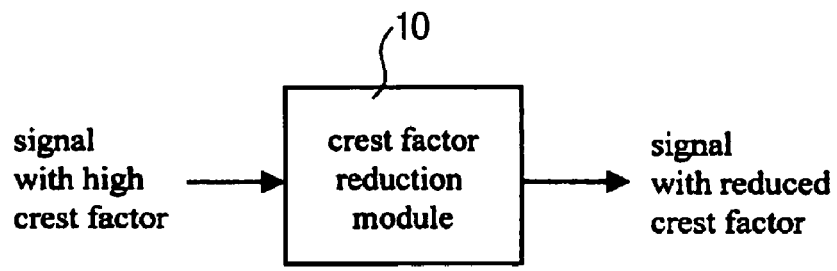
FIG. 2a illustrates a crest factor reduction module according to the present invention.

FIG. 2a illustrates a crest factor reduction module according to the present invention. As shown in FIG. 2a, the present invention receives an input signal with a high crest factor (analog or digital signal) and outputs a signal with reduced crest factor (analog or digital signal) using the crest factor reduction module 10. The input and output signals can be low-frequency baseband signals (real or complex), IF (hundreds of MHz) or RF (several through tens of GHz) signals. The phases of the signals correspond to real or complex—having I/Q or in-phase/quadrature-phase components.

Figure 2B:
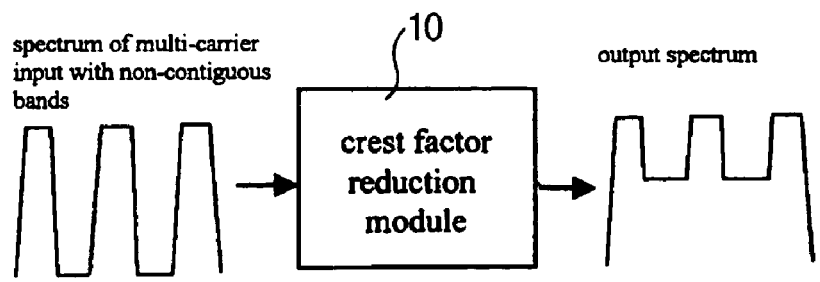
FIG. 2b illustrates distortion of the spectrum of an output signal when a multi-carrier signal with non-contiguous bands is input to the crest factor reduction module of the present invention.
Figure 2C:
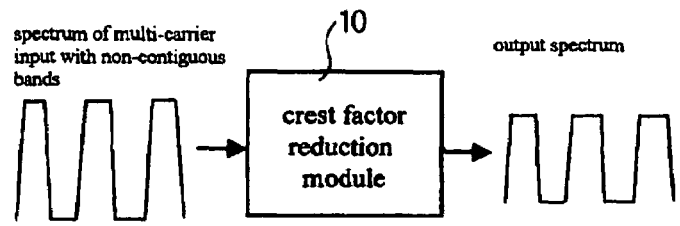
FIG. 2c illustrates the crest factor reduction module that is ideally operated to output a signal having the same spectrum as that of a multi-carrier input signal when the multi-carrier signal is input to the crest factor reduction module of the present invention.

In the present invention, the input signal with high crest factor may include non-contiguous band signals (that is, multi-carrier signals) as well as contiguous band signals. Furthermore, the spectrum of the signal output from the crest factor reduction module 10 must be similar to the spectrum of the input signal. This is illustrated in FIGS. 2b and 2c. FIG. 2b illustrates an output signal having a distorted spectrum when a multi-carrier signal with non-contiguous bands is input to the crest factor reduction module 10. FIG. 2c illustrates the crest factor reduction module that is ideally operated to output a signal having the same spectrum as that of the input signal even when a multi-carrier signal is input to the crest factor reduction module 10 as the input signal.

As described above, the present invention provides a crest factor reduction module whose performance is not deteriorated even when multi-carrier signals (that is, non-contiguous band signals) as well as contiguous band signals are input thereto.

Preferred embodiments of the present invention will now be explained with reference to the attached drawings.

Figure 3:
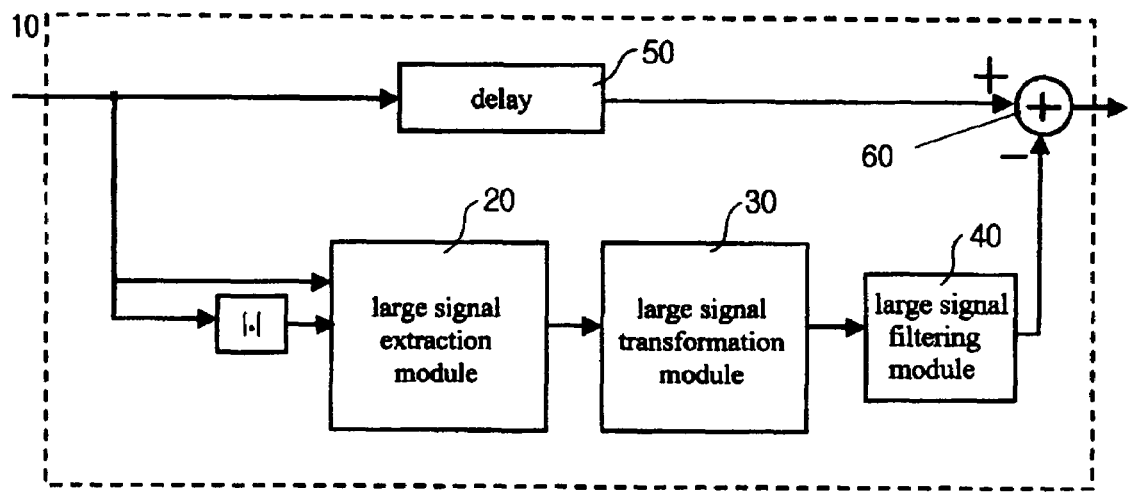
FIG. 3 is a block diagram of a crest factor reduction system according to the present invention.

FIG. 3 is a block diagram of a crest factor reduction system according to the present invention. Referring to FIG. 3, the crest factor reduction system according to the present invention includes a large signal extraction module 20, a large signal transformation module 30, a large signal filtering module 40, a delay means 50, and a combiner 60.

The large signal extraction module 20 receives an input signal and the magnitude of the input signal to extract a signal greater than a predetermined threshold θ (referred to as a large signal hereinafter). The large signal transformation module 30 transforms the large signal extracted by the large signal extraction module 20 into a monotonically increasing concave function. The large signal filtering module 40 passes a predetermined band of the large signal transformed by the large signal transformation module 40. The delay means 50 shifts the phase of the input signal. The combiner 60 combines the signal output from the large signal filtering module 40 with the input signal whose phase has been shifted by the delay means 50 to reduce the crest factor of the input signal.

That is, the present invention combines the signal filtered by the large signal filtering module 40 with the input signal whose phase has been shifted by the delay means 50 that is a time delay component, to obtain a signal with a reduced crest factor.

In the present invention, the above-described large signal is a signal whose magnitude equals or exceeds a specific threshold value. The operation of the large signal extraction module 20 will now be explained with reference to FIG. 4a.

The large signal extraction module 20 extracts a signal from an input signal s(n) and the magnitude of the input signal, |s(n)|, in response to a predetermined threshold θ and outputs a signal d(n) through the following Equation 2.

$$d(n)=0, \text{ if}|s(n)|\leq \theta \| =(|s(n)|-\theta) \ s(n)0, \text{ if}|s(n)|>\theta \| =(|s(n)|-\theta)s(n), \text{ if}|s(n)|>\theta \quad \text{[Equation 2]}$$

Figure 4A:
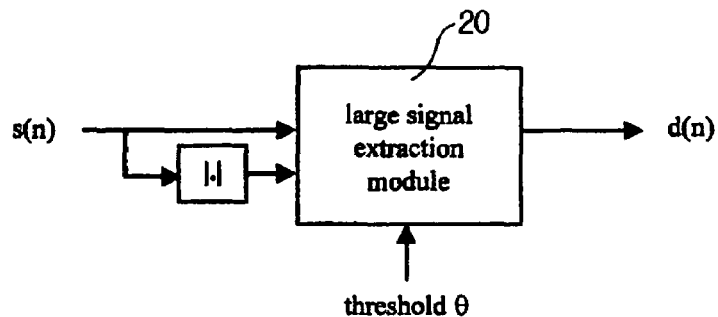
FIG. 4a illustrates the operation of a large signal extraction module.

As shown in FIG. 4a, the input signal s(n) and the magnitude of the input signal, |s(n)|, are input to the large signal extraction module 20. These two input signals are processed by the large signal extraction module 20 through Equation 2 in response to the threshold θ to be output as the signal d(n).

The present invention can allow the threshold θ to be programmable such that the crest factor reduction module can be applied in various manners depending on the threshold θ set by the designer.

Figure 4B:
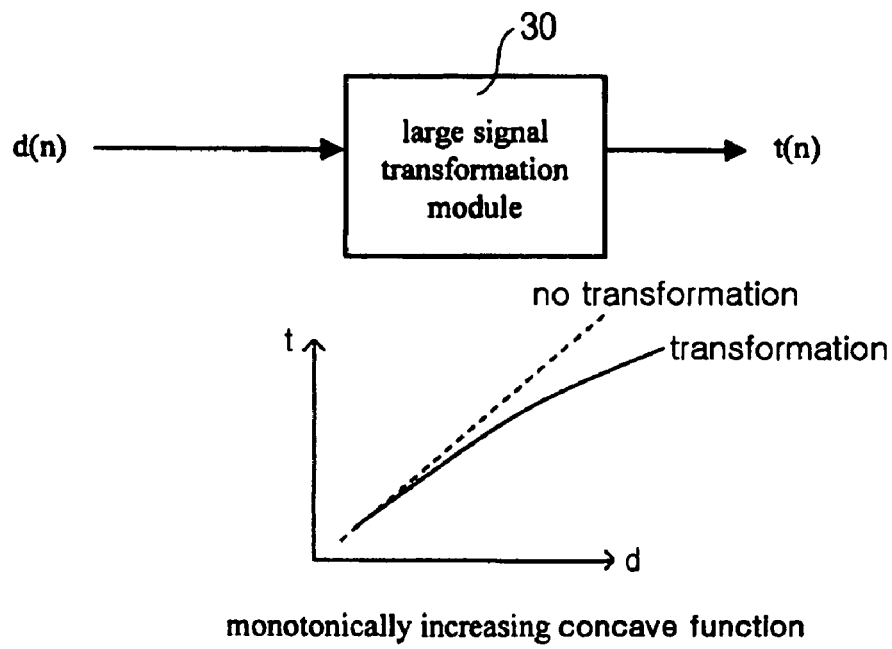
FIG. 4b illustrates the operation of a large signal transformation module.

The operation of the large signal transformation module for transforming the signal d(n) output from the large signal extraction module to the monotonically increasing concave function is illustrated in FIG. 4b. It can be seen from FIG. 4b that the function of the signal transformed by the large signal transformation module 30 is a monotonically increasing concave function.

Referring to FIG. 4b, the signal transformed by the large signal transformation module 30 is a monotonically increasing function and, at the same time, a concave function monotonically increasing its distance from the straight line given by t=d. Here, the transformed signal t(n) can include all functions having values smaller than the straight line of t=d while being monotonically increasing concave functions. An example of these functions is represented by the following equation.

$$t(n) = \sum_{k} a_k d(n)^k \quad \text{[Equation 2]}$$

Here, k is a natural number larger than 1, and $\alpha_k > 0$.

In Equation 3, when $\alpha_k$ is decided, the condition of the monotonically increasing concave function is satisfied.

For reference, the concave function means a function in which the average of the function values of any two arbitrary points is identical to or larger than the function value of the midpoint of the two points. When such a function is shown on the x-y coordinate system it has a concave shape.

Returning to FIG. 3, the signal output from the large signal transformation module 30 is filtered by the large signal filtering module 40 so that only the portion of the signal that lies within a specific band is output from the large signal filtering module 40. The pass bandwidth of the large signal filtering module 40 can be controlled by the designer.

The large signal filtering module 40 can employ a combination of a plurality of bandpass filters. Here, the pass band of each of the bandpass filters corresponds to each carrier band of the input signal. That is, the bandpass filters can have an identical center frequency and their bandwidths can be narrower than the input carrier bandwidth. This can be designed by the designer.

Figure 4C:
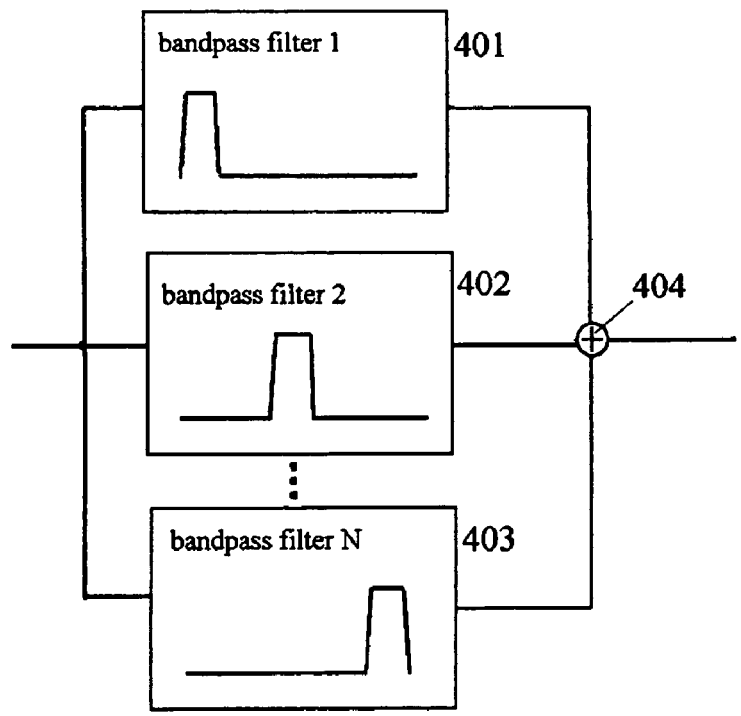
FIGS. 4ca, 4cb and 4cc illustrate the configuration and operation of a large signal filtering module.
Figure 4C:
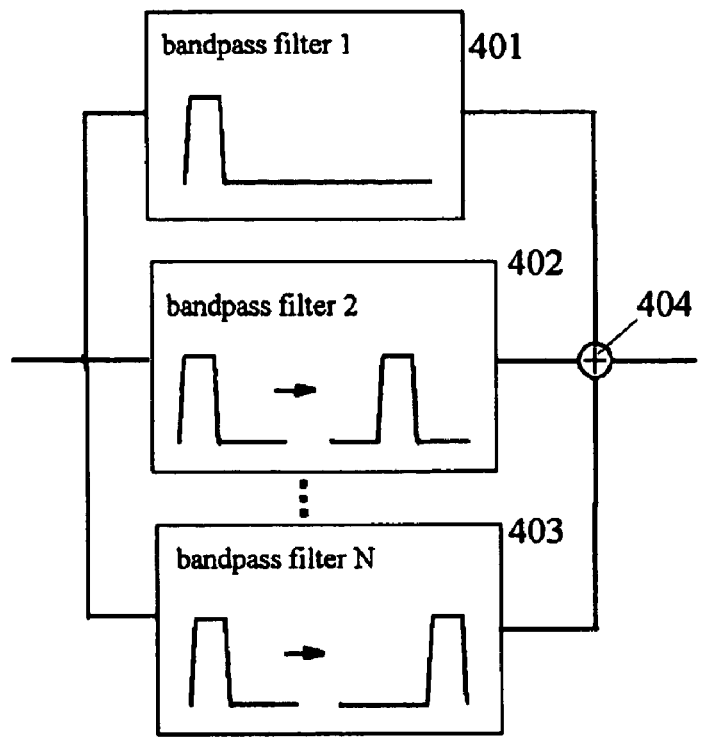
Figure 4C:
Figure 4C:
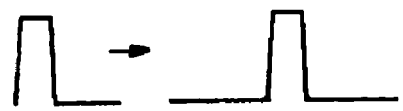

The operation of the large signal filtering module 40 will now be explained with reference to FIGS. 4ca, 4cb and 4cc. FIG. 4ca illustrates the large signal filtering module 40 including N bandpass filters 401, 402 and 403. The large signal filtering module filters the signal output from the large signal transformation module 30 through the bandpass filters 401, 402 and 403 having respective unique pass bands, and adds up the filtered signals using an adder 404.

Here, frequency shift relationships (note that a frequency shift in a frequency domain is equivalent to multiplication in a time domain) are applied to the filters 401, 402 and 403.

Specifically, as shown in FIG. 4cb, the signal that has passed through the second bandpass filter 402 corresponds to a signal shifted from the signal that has passed through the first bandpass filter 401 by a predetermined frequency, and the signal that has passed through the Nth bandpass filter 403 corresponds to a signal further shifted from the signal that has passed through the first 10 bandpass filter 401 by the predetermined frequency. This relationship is generalized and represented by the following equation.

$$h(n) = h_1(n)\left|\sum_{k=1}^{N} e^{j2\pi(f_k - f_1)n}\right|$$ [Equation 4]

Here, h(n) denotes a response characteristic corresponding to the sum of characteristics of the filters, and $h_1(n)$ represents an impulse response of the first bandpass filter. The filters can alternatively be lowpass filters depending on the kind of the input signal. In addition, $f_k$ is the center frequency of the kth bandpass filter, and N corresponds to the number of carriers of a multi-carrier input signal.

Equation 4 means that the number of filters required is equivalent to the number of carriers of the multi-carrier signal. However, when the relationship of Equation 4 is used, the required filters can be easily constructed for any combination of carriers if only $h_1(n)$ and $f_k$ are known.

Accordingly, when the center frequency of the first bandpass filter is $f_l$ and a response when an impulse signal is applied to the first bandpass filter is $h_l(n)$, the center frequency of the kth bandpass filter can be considered to be shifted to $f_k$ and its impulse response $h_k(n)$ is represented as follows.

$$h_k(n) = h_l(n)e^{j2\pi(f_k - f_l)n}$$ [Equation 5]

Here, when the input signal is a single-carrier signal or, even if the input signal is a multi-carrier signal, as long as all of the carrier signals are contiguously distributed, the large signal filtering module 40 can consist of a single lowpass filter corresponding to the entire signal band.

Figure 5:
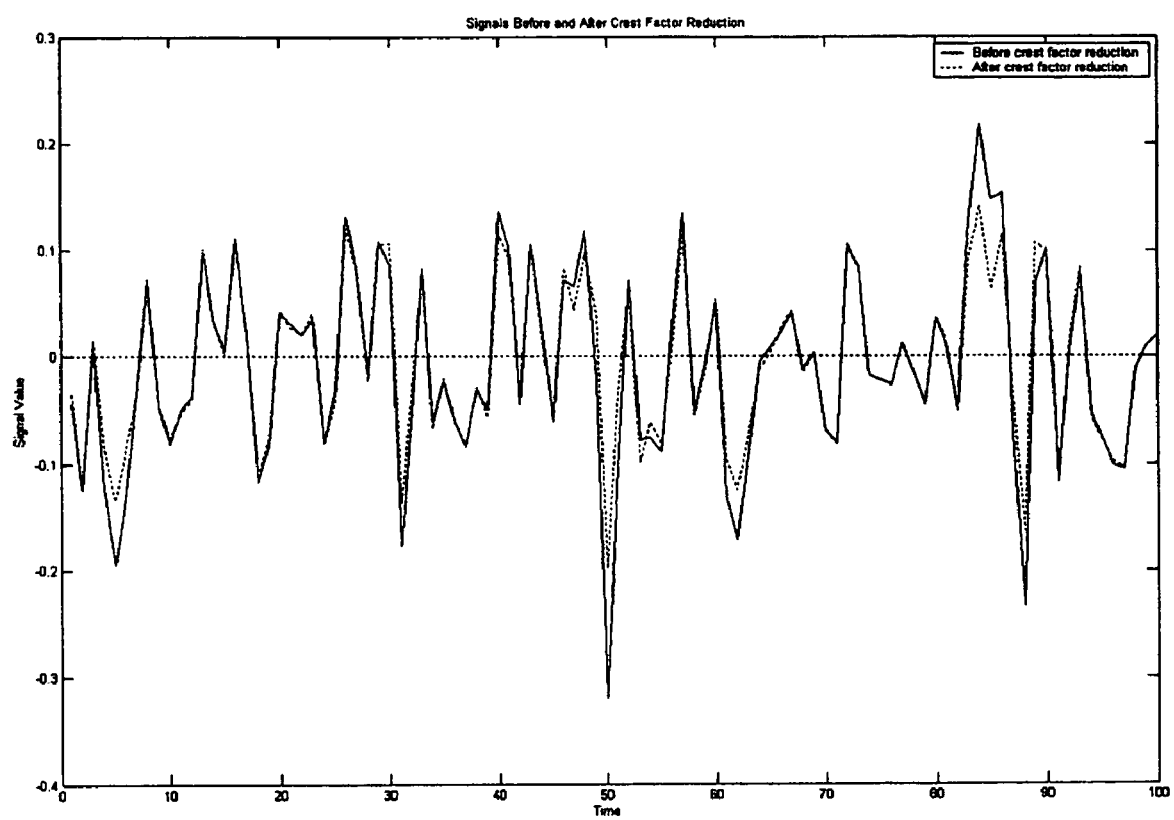
FIG. 5 illustrates the waveform of a signal whose crest factor has been reduced through the crest factor module of the present invention.

Referring back to FIG. 3, the combiner 60 combines the signal output from the large signal filtering module 40 with the input signal whose phase has been shifted by the delay means 50 and outputs a signal with reduced crest factor. FIG. 5 illustrates the waveform of the signal whose crest factor has been reduced through the crest factor module of the present invention.

Figure 6:
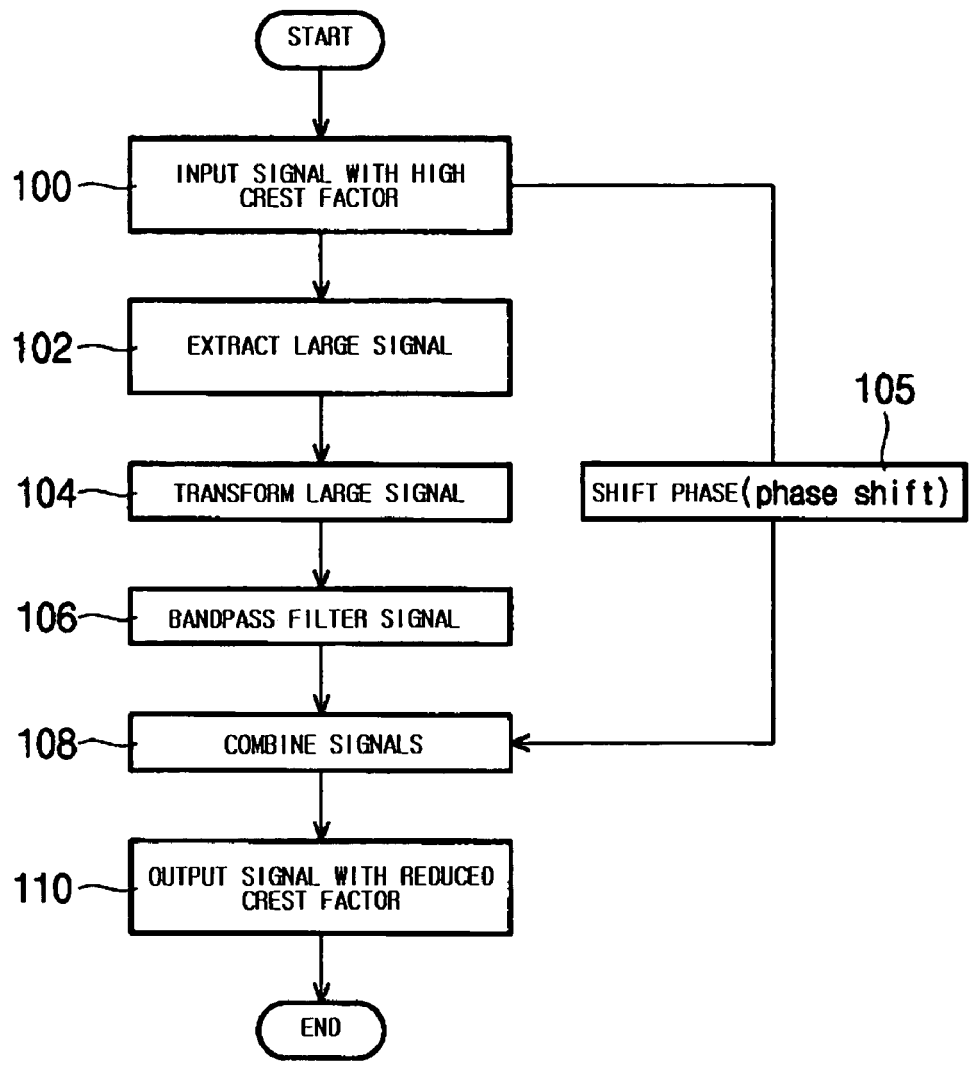
FIG. 6 is a flow chart showing a method for reducing the crest factor of a signal according to the present invention.

A method for reducing the crest factor of a signal using the crest factor reduction module of the present invention is illustrated in FIG. 6. Referring to FIG. 6, when an input signal and the magnitude of the input signal are input to the crest factor reduction module in step 100, the large signal extraction module extracts a large signal in step 102. Here, the large signal means a signal that equals or exceeds a threshold value as described above.

The extracted large signal is transformed by the large signal transformation module to a monotonically increasing concave function in step 104. The signal transformed by the large signal transformation module is filtered by the large signal filtering module in step 106. In step 108, the filtered signal is combined with the input signal whose phase has been shifted by the delay means in step 105. According to the combination of the two signals, a signal with reduced crest factor is output in step 110.

The signal extraction operation of the signal extraction module and the waveform of the signal transformed by the signal transformation module are explained above so that detailed explanations thereof are omitted.

The crest factor reduction module according to various embodiments of the present invention will now be explained.

Embodiment 1

Figure 7A:
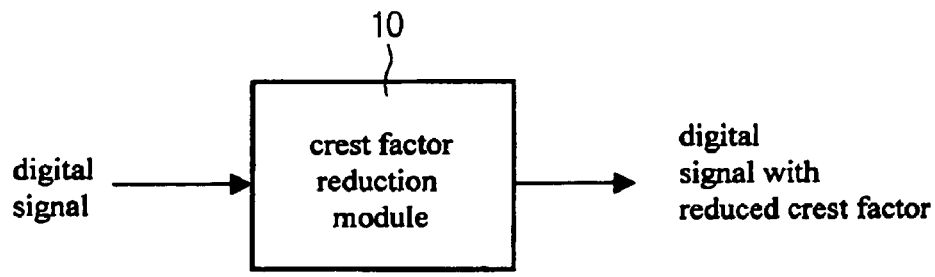
FIG. 7a illustrates a crest factor reduction module according to a first embodiment of the present invention.

FIG. 7a illustrates a crest factor reduction module 10 that receives a low-frequency digital signal and outputs a digital signal with reduced crest factor.

Embodiment 2

Figure 7B:
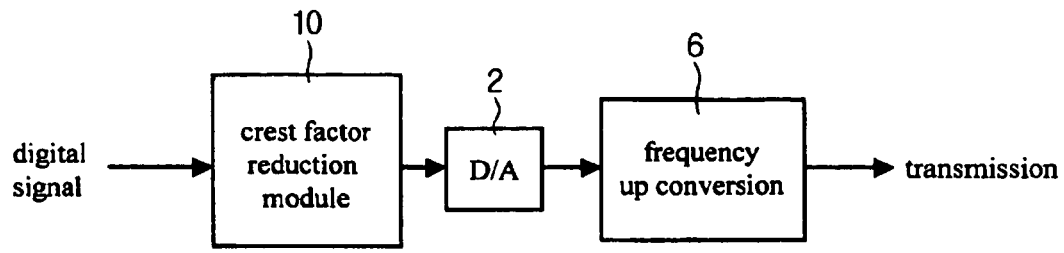
FIG. 7b illustrates a crest factor reduction module according to a second embodiment of the present invention.

FIG. 7b illustrates a crest factor reduction module 10 used for transmission of a digital signal with a reduced crest factor. Specifically, the crest factor reduction module 10 receives an input digital signal and outputs the digital signal with a reduced crest factor. Then, a D/A converter 2 converts the output digital signal to a corresponding analog signal. A frequency up-converter 6 receives the analog signal output from the D/A converter 2 and converts it to an RF signal. The frequency up-converter 6 changes a carrier frequency as well known in the art. When the analog signal is converted to an RF signal using the frequency up-converter 6 and then transmitted, the analog signal becomes robust against noise. Furthermore, means for recovering errors in signals can be employed when the frequency up-converter is used in the crest factor reduction system.

Embodiment 3

Figure 7C:
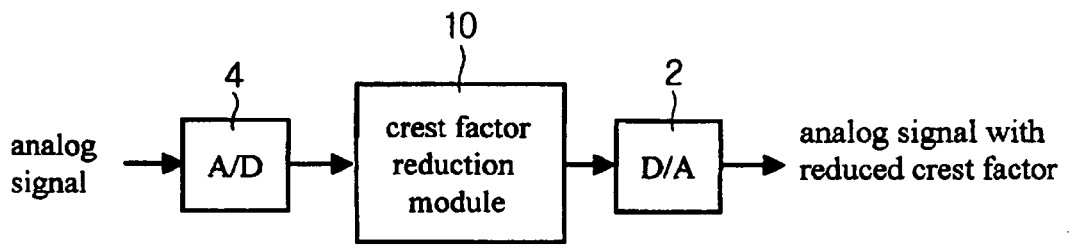
FIG. 7c illustrates a crest factor reduction module according to a third embodiment of the present invention.

FIG. 7c illustrates a crest factor reduction module 10 that receives an analog signal and outputs an analog signal with a reduced crest factor. Specifically, an A/D converter 4 converts the analog signal to a digital signal. Then, the crest factor reduction module 10 receives the digital signal and outputs a digital signal with a reduced crest factor. The output digital signal is converted by a D/A converter 2 to an analog signal to be output as an analog signal with a reduced crest factor.

Embodiment 4

Figure 7D:
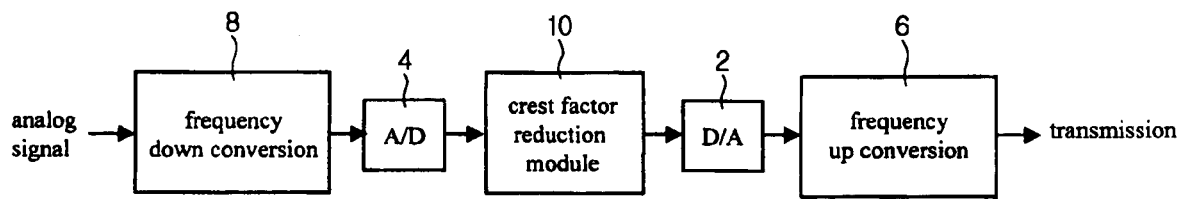
FIG. 7d illustrates a crest factor reduction module according to a fourth embodiment of the present invention.

FIG. 7d illustrates a crest factor reduction module 10 for transmission of an analog signal with a reduced crest factor. Specifically, a frequency down-converter 8 converts the frequency of an input analog signal to the frequency of the original signal. An A/D converter 4 converts the converted signal to a digital signal. The crest factor reduction module 10 receives the digital signal and outputs a digital signal with a reduced crest factor. The output digital signal is converted by a D/A converter 2 to an analog signal. The analog signal output from the D/A converter 2 is converted by a frequency up-converter 6 to an RF signal to be transmitted.

According to the present invention, crest factor reduction can be carried out without having information about an individual channel and applied to baseband, IF and RF signals. Furthermore, the crest factor reduction module of the present invention allows the large signal filtering module to be easily designed. Moreover, the crest factor reduction module can be applied in various manners by setting the value of a programmable parameter (the threshold θ).

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A system for reducing a crest factor of a multi-carrier input signal including at least one carrier, the system comprising:

a large signal extraction module for receiving the input signal and the magnitude of the input signal to extract a large signal greater than a predetermined threshold θ;

a large signal transformation module for convening the extracted large signal to a monotonically increasing concave function;

a large signal filtering module for filtering the large signal transformed by the large signal transformation module to pass a predetermined band of the large signal;

delay means for shifting the phase of the input signal; and a combiner for combining the signal output from the large signal filtering module with the input signal whose phase has been shifted by the delay means to reduce the crest factor of the input signal, wherein said large signal extraction module extracts the large signal through the following equation $$d(n)=0, \text{ if } |s(n)|\leq\theta=(|s(n)|-\theta)s(n), \text{ if } |s(n)|>\theta$$

(Here, $|s(n)|$ is the magnitude of $s(n)$), wherein $d(n)$ is the large signal, $s(n)$ is the input signal, $\theta$ is the predetermined threshold and $n$ is a time sequence.

2. The system as claimed in claim 1, wherein the value of the threshold θ used for extracting the large signal is variably programmable.

3. The system as claimed in claim 1, wherein the monotonically increasing concave function is represented as follows:

$$t(n) = \sum_k a_k d(n)^k$$

(here, k is a natural number larger than 1, and $\alpha_k>0$), wherein $t(n)$ is the transformed large signal, $\alpha$ is a coefficient, $d(n)$ is the large signal, and n is the time sequence.

4. The system as claimed in claim 1, wherein the large signal filtering module includes first through Nth bandpass filters connected to one another in parallel, for respectively receiving the output signal of the large signal transformation module, and an adder for adding up the output signals of the bandpass filters, and wherein the pass bandwidths of the bandpass filters correspond to the bands of the carriers included in the input signal.

5. The system as claimed in claim 4, wherein impulse response characteristics of the first through Nth bandpass filters are represented as follows:

$$h(n) = h_1(n)\left|\sum_{k=1}^{N} e^{j2\pi(f_k-f_1)n}\right|$$

(here, h(n) denotes the response characteristic corresponding to the sum of characteristics of the bandpass filters, $h_1(n)$ represents the impulse response of the first bandpass filter, $f_k$ is the center frequency of the kth bandpass filter, and N corresponds to the number of carriers of the multi-carrier input signal).

6. A method for reducing a crest factor of a multi-carrier input signal including at least one carrier, the method comprising the steps of:

receiving the input signal and the magnitude of the input signal to extract a large signal greater than a predetermined threshold θ;

transforming the extracted large signal to a monotonically increasing concave function;

filtering the transformed large signal to pass a predetermined band of the transformed large signal;

shifting the phase of the input signal;

combining the filtered large signal with the input signal whose phase has been shifted; and outputting a signal whose crest factor has been reduced according to the combination of the two signals, wherein said large signal is extracted through the following equation:

$$d(n)=0, \text{ if } |s(n)|\leq\theta=(|s(n)|-\theta)s(n), \text{ if } |s(n)|>\theta$$

(here, $|s(n)|$ is the magnitude of $s(n)$), wherein $d(n)$ is the large signal, $s(n)$ is the input signal, $\theta$ is the predetermined threshold and $n$ is a time sequence.

7. The method as claimed in claim 6, wherein the value of the threshold θ used for extracting the large signal is variably programmable.

8. The method as claimed in claim 6, wherein the monotonically increasing concave function is represented as follows:

$$t(n) = \sum_k a_k d(n)^k$$

(here, k is a natural number larger than 1, and $\alpha_k>0$), wherein $t(n)$ is the transformed large signal, $\alpha$ is a coefficient, $d(n)$ is the large signal and n is the time sequence.

9. The method as claimed in claim 6, wherein the large signal filtering step further comprises a step of receiving the transformed large signal through first through Nth bandpass filters connected to one another in parallel and adding up the output signals of the bandpass filters, the pass bandwidths of the bandpass filters corresponding to the bands of the carriers included in the input signal.

10. The method as claimed in claim 9, wherein impulse response characteristics of the first through Nth bandpass filters are represented as follows:

$$h(n) = h_1(n)\left|\sum_{k=1}^{N} e^{j2\pi(f_k-f_1)n}\right|$$

(here, h(n) denotes the response characteristic corresponding to the sum of characteristics of the bandpass filters, $h_1(n)$ represents the impulse response of the first bandpass filter, $f_k$ is the center frequency of the kth bandpass filter, and N corresponds to the number of carriers of the multi-carrier input signal).

11. The method as claimed in claim 6, wherein the large signal filtering step further comprises a step of filtering the transformed, large signal using a single low pass filter.

* * * * *